United States Patent [19]

Friedgen et al.

[11] 3,708,141
[45] Jan. 2, 1973

[54] FISHING ROD HOLDER
[76] Inventors: Arthur H. Friedgen, Omaha, Nebr. 68152; Warren R. Nohrenberg, Omaha, Nebr. 68111
[22] Filed: May 3, 1971
[21] Appl. No.: 139,653

Related U.S. Application Data
[63] Continuation-in-part of Ser. No. 851,793, Aug. 21, 1969.

[52] U.S. Cl. ................... 248/42, 248/291, 248/314
[51] Int. Cl. ............................................ A01k 97/10
[58] Field of Search .......... 248/38, 39, 40, 41, 42, 43, 248/82, 84, 86, 88, 291, 314, 316 R, 316 B, 397; 287/1–14

[56] References Cited

UNITED STATES PATENTS 2,695,761  11/1954  Carpenter et al. ............ 248/316 R X
2,836,225   5/1958  Swenson ........................... 248/397
2,981,509   4/1961  Messenger et al. .................. 248/42
3,010,687  11/1961  Hagberg ............................ 248/38
3,145,005   8/1964  Wester ............................. 248/40

Primary Examiner—William H. Schultz
Attorney—Kemon, Palmer & Estabrook

[57] ABSTRACT

A fishing pole or rod holder with an elongated body defining a receptacle or housing that is pivotally mounted at one end upon a vertical support. A lever pivotally mounted on the vertical support is designed to engage a projection on the body for adjustably positioning the body with respect to said support. The receptacle or housing is provided with a clamp for securing the fishing pole or rod therein.

8 Claims, 8 Drawing Figures

PATENTED JAN 2 1973 3,708,141

INVENTORS
ARTHUR H. FRIEDGEN
WARREN R. NOHRENBERG

BY Kenyon, Palmer & Estabrook
ATTORNEYS

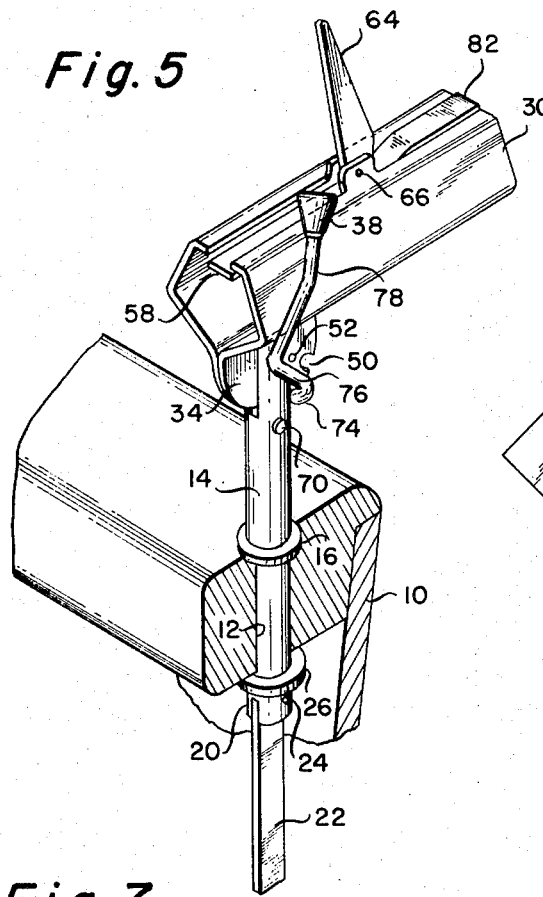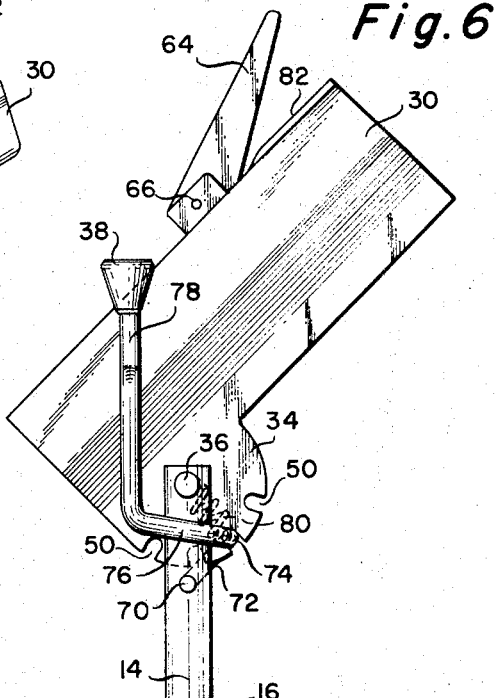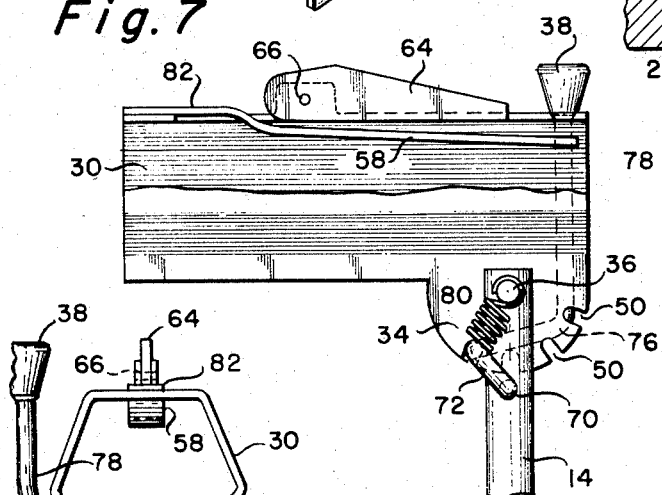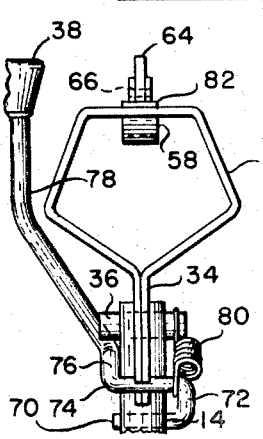

FISHING ROD HOLDER

CROSS-REFERENCE TO RELATED APPLICATION

This Application is a continuation-in-part of our application Ser. No. 851,793 filed Aug. 21, 1969.

BACKGROUND OF THE INVENTION

The present invention is directed to a support or holder for a pole or rod of the type commonly employed in fishing from small boats, such as, in trolling or drift fishing or still fishing. In the greater majority of fishing rod holders, as depicted by the prior art, a clamp is utilized for securing the holder to the gunwale or transom of a small row boat or the like. In many instances, the clamps employed a plurality of wing nuts or set screws, or in lieu thereof, a conventional type of C-clamp was often the means used for securing the holder in place, thus, making for a cumbersome structure. The prior art also discloses various and sundry ways and means for adjusting the portion of the holder that receives the butt end of the fishing rod with respect to the clamping structure. The use of pins inserted into aligned apertures is often employed as are toothed segments which have pins inserted therein and secured by wing nuts or the like. It becomes readily apparent that such mechanisms do not lend themselves to an easy and positive manner of adjusting or varying the angle of the holder of the fishing pole or rod with respect to its clamping structure. The necessity of removing wing nuts and then pins in order to change or vary the angle of the holder with respect to the clamping structure always poses the situation of where said nut or pins might be dropped in the water with the result that the entire holder then becomes useless and of no value. Thus, in many instances, prior art devices have been found to be rather cumbersome in their mode of operation and use.

SUMMARY OF THE INVENTION

The present invention is directed to a holder for a fishing pole or rod having a vertical support that is insertable into a pin type oarlock of a small boat and then readily clamped in said oarlock. The holder is provided with a locking member to insure the retention of the butt end of the fishing pole or rod within said holder. In addition the holder is formed with disc like segmental portions that project radially outwardly from a side portion of the holder adjacent an end thereof. The disc like portions are pivotally connected to the vertical support and due to said portion being formed on the housing between the center of the housing and an end the greater portion of the weight of the housing will be offset as regards the pivotal connection of the housing to the support. This offsetting of the weight of the housing will result in the housing moving about its pivotal connection to the support and this movement will be further enhanced when the butt end of a fishing pole or rod is placed in the holder. In order to limit the pivotal movement of the holder about its pivotal connection to the support the disc like portions are provided with a stop member that engages said support. In addition to the foregoing a locking member is carried by the support and configured to engage the segmental portions for varying the position of the holder relative to the support.

DESCRIPTION OF THE DRAWING

FIG. 5 is an elevational view of a modified form of holder embodying the present invention;

FIG. 6 is an elevational view, with portions in section, showing the holder rotated through an angle of 90° from the position shown in FIG. 5;

FIG. 7 is an elevational view of a portion of the holder shown in FIG. 5; and

FIG. 8 is an end view of the holder shown in FIG. 7.

PREFERRED EMBODIMENTS OF THE INVENTION

Figure 1:
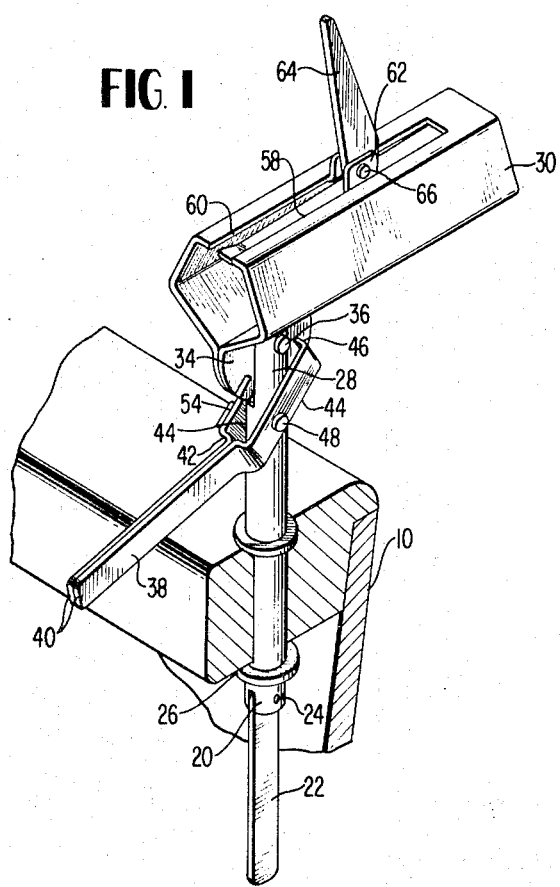
FIG. 1 is an elevational view, with portions in section, showing the fishing pole or rod holder of the present invention mounted in a pin type oarlock.
Figure 2:
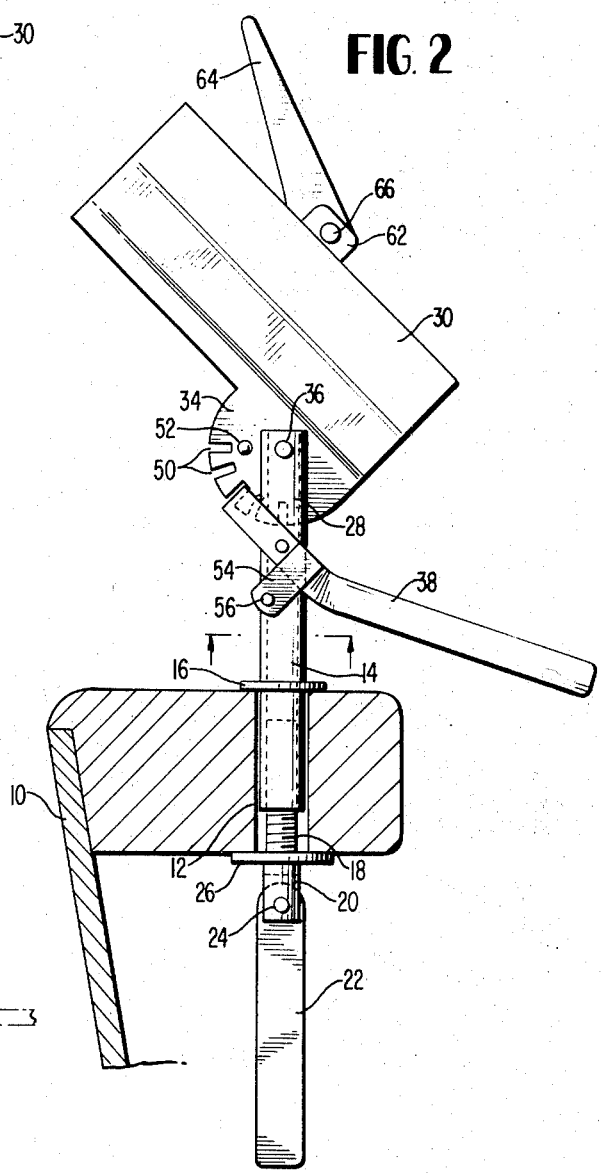
FIG. 2 is an elevational view, with portions in section, showing the holder rotated through an angle of 90° from the position shown in FIG. 1.

Referring to FIGS. 1 and 2 of the drawings, there is shown a gunwale 10 of a conventional small rowboat. The gunwale 10 is designed to carry and support a conventional oarlock receptacle or holder 12 which is designed to receive and hold the stem or shank of a conventional pin type oarlock, not shown. The oarlock receptacle 12 has positioned therein, for free rotative movement with respect thereto, the lower end portion of a vertically extending tubular support member 14. The tubular support member 14 has affixed thereto an annular flange or collar 16 which engages the upper surface of the oarlock receptacle 12 for limiting or positioning the tubular support member 14 within said receptacle. The lower end portion of the tubular support member 14 is drilled and tapped in order to receive the threaded shank portion 18 of a locking bolt member 20. The lower end of the bolt member 20 is provided with a transversely extending slot which is designed to receive the end of a lever 22. The end of the lever 22 is secured in said slot by means of a pin 24 which enables the threaded shank portion 18 of the bolt member 20 to be threaded into the end of the tubular support member upon rotative movement of the lever 22. The locking bolt member 20 is also provided with an annular collar or stop member 26 that engages the lower surface of the oarlock receptacle 12 and thus, cooperates with the annular flange member 16 in clamping and retaining the tubular support member 14 within the oarlock receptacle 12.

Figure 3:
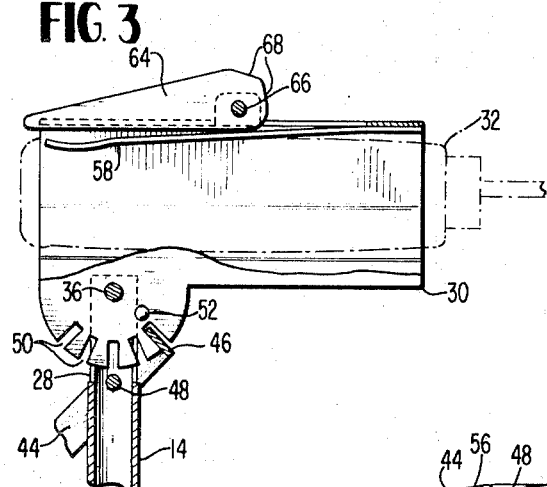
FIG. 3 is an elevational view of a portion of the holder shown in FIG. 1 illustrating the clamping of a butt end of a fishing pole or rod in the holder.

The upper end of the tubular support member 14 is formed with a bifurcated end defining a pair of legs 28 which have pivotally connected thereto one end of an elongated housing or receptacle 30. The housing or receptacle 30 is designed to receive and support the butt end of a fishing rod 32, as illustrated in FIG. 3, which fishing rod may be of the common pole type or it may be one equipped with a casting reel. While the housing 30 may be of any desired shape such as rectangular or circular in cross section, it has been shown for purposes of illustration, as being of pentagonal configuration in cross section. It is to be noted that said housing 30 may be formed from a single piece of material with the respective ends of said material abutting one another along the bottom of the housing with said ends being secured to one another by any suitable means such as welding. The ends of the material forming the housing 30 are designed to terminate in disc like segments 34 that project radially outwardly from the housing. The disc like segments 34 are formed on the outer surface of the housing between the center of the housing and one end thereof so that the segments are offset from the center of the housing as clearly shown in FIG. 2. The segments 34 are maintained in face abutting relation with one another as they are positioned between the legs 28 of the bifurcated end of the tubular support member 14. The segments 34 are secured to the legs 28, for pivotal movement with respect thereto, by means of a pin 36 so that the housing 30 is thus supported on the upper end of the tubular support member 14 and is capable of having a pivotal movement with respect to said support member through the medium of the pin 36. The disc like segments 34 being offset from the center of the housing permit the housing, due to its weight, to pivot about the pin 36 in a clockwise manner when viewing FIG. 1 and this pivotal movement is further enhanced when a fishing rod or pole is mounted in the housing.

Figure 4:
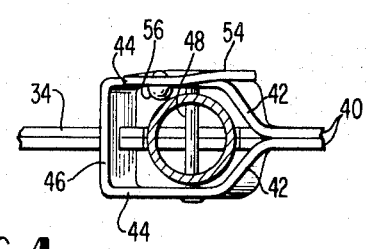
FIG. 4 is a cross-sectional view of the clamping means for angularly positioning the holder with respect to its support, the view being taken on the line 4—4 of FIG. 2.

The tubular support member 14 has mounted thereon subjacent the bifurcated end portion, a handle 38 which is designed to lock or position the housing 30 with respect to the tubular support member 14. The handle 38 is composed of a pair of parallel plate like members 40 which are positioned in abutting relation with one another throughout the greater portion of their length. The members 40, adjacent one end thereof, are bent outwardly at substantially right angles with respect to one another to form segments 42, see FIG. 4. The segments 42 are then bent backwardly upon themselves so as to define legs 44 that are disposed in space parallel relation to one another and also in parallel relation with respect to the plate like members 40. The legs 44 terminate in a transverse connecting member 46, which together with the legs 44 and segments 42 define a rectangular box like shape at one end of the handle 38. The box shaped end portion of the handle 38 overlies or encircles the tubular support member 14 with the legs 44 being pivotally connected to said support by means of a pin or rod 48. The disc like segments 34 are provided with a plurality of spaced slots 50, and said slots are configured to receive the transverse member 46 of the handle 38 so as to lock and position the housing 30 in one of a plurality of positions with respect to the end of the tubular support member 14. At least one of the segments 34 is provided with a projection 52, FIGS. 2 and 3, which is designed to engage a leg 28 of the bifurcated end of the tubular support member 14 so as to limit the movement of the housing 30 and segments 34 in at least one direction with respect to the tubular support member 14. As shown in FIGS. 2 and 4, the handle 38 is formed with a depending arm 54 which is provided at its free end with a protuberance 56 that is designed to engage the support member 14 so as to limit, in at least one direction, the pivotal movement of the handle 38 about the pin 48.

The elongated housing or receptacle 30 is provided with means for locking or securing the retention of the butt end 32 of a fishing pole or rod therein. The locking means consists of an elongated flap like segment or member 58 which is formed in a surface of the housing by providing a pair of spaced parallel cuts or slots 60 that extend inwardly from one end of the housing but terminate a slight distance from the other end of the housing. The flap like segment or member 58 is still in effect, an integral part of the housing or receptacle 30 but due to the cuts or slots 60, said segment or member is capable of having a movement independently of the housing. The portion of the housing 30 in which the flap like segment or member 58 is formed is also provided with a pair of upstanding flange members 62 which have a lever 64 pivotally connected thereto by means of a pin 66. The lower end of the lever 64 is formed with a pair of camming surfaces 68 which engage the segment or member 58 for forcing same inwardly of the housing 30 and into engagement with the butt end of a fishing pole or rod.

In the use of the holder of the present invention, the locking bolt member 20 is removed from the lower end of the tubular support member 14 by means of the lever 22, and then the lower end of the support member is inserted into the oarlock receptacle 12 after which the threaded shank portion 18 of the locking bolt member 20 is rotatably mounted within the lower end of the support member until the annular stop member 26 as well as the annular collar 16 are bottomed to insure the retention of the vertical support member in the oarlock receptacle. The position of the vertical tubular support member 14 may be readily changed within the oarlock receptacle 12 by simply loosening the locking member 20 by means of the lever 22 and then rotating the support member to any desired position after which the bolt member 20 may be clamped into locking position upon rotation of the lever 22. The butt end of a fishing pole or rod may then be inserted into the housing 30 and clamped therein by rotating the lever 64 about the pin 66 so as to force the flap like segment or member 58 down into engagement with the butt end of said pole or rod. With the fishing pole or rod positioned within the housing or receptacle 30, said housing and fishing rod or pole may then be positioned in one of a plurality of angular positions with respect to the vertical support member 14 simply by moving the handle 38 about the pin 48 so as to draw the transverse member 46 out of one of the slots 50 and then moving the housing 30 about its pivot pin 36 so as to change the angular position of the housing 30 with respect to the vertical support member 14. The weight of the housing with the fishing pole or rod therein is such that the housing 30 will tend to move about its pivot pin 36 in a clockwise manner, FIG. 1, and will continue to so move until the stop 52 engages the vertical support 14 unless the transverse member 46 of the handle structure is inserted into one of the slots 50. This pivotal movement is due to the disc like segments 34 being offset from the center of the housing and the fact that the pivot pin 36 extends through said segments. The entire fishing rod holder may be formed from any suitable material such as metal or plastic, and from the standpoint of metals, stainless steel has been found to be very satisfactory.

The modified holder shown in FIGS. 5 through 8 is similar in most respects to the holder shown in FIGS. 1 though 4 and like parts have been identified by the same reference numerals. The locking handle 38 shown in FIGS. 5 through 8 is formed as a unitary element from a single piece of material that is bent or so configured as to form a first horizontal portion 70, FIG. 8, which is pivotally mounted in the vertical support 14 subjacent the legs 28. One end of the horizontal portion 70 is bent upwardly and forwardly, FIG. 7, to define an inclined segment 72 that terminates in a horizontal part 74 that is parallel to the horizontal portion 70. The horizontal part 74 terminates in an inclined section 76 that is bent backwardly and slightly upward and which section terminates in a vertically extending member 78 which maybe slightly bowed so as to project alongside of and slightly above the housing 30.

The horizontal part 74 is similar to the transverse connecting member 46 of the handle 38 in that said part 74 engages the slots 50 in the disc like segments 34 to position and lock the housing 30 in various positions with respect to the vertical support 14. A coil spring 80 is connected to the horizontal part 74 of the handle structure and also to the pin 36 to insure that the handle is spring biased to a locking position with the part 74 being positioned within one of the slots 50. In order to change the position of the housing 30 with respect to the support 14 the vertical member 78 of the handle structure must have sufficient force applied thereto to overcome the retentive action of the spring 80 and permit the horizontal part 74 to be moved out of one slot 50 and then into another slot 50. The projection 52 acts as a stop member in engaging one of the legs 28 to restrict the movement of the housing 30 about the pivot pin 36 which movement is occasioned by the offsetting of the outwardly radial projecting disc segments 34 from the center portion of the housing 30 in the manner as shown in FIG. 2 and 6.

The offsetting of the disc like segments 34 and the weight of the housing 30 cause the housing to move about the pivot pin 36 in a clockwise manner, when viewing FIG. 6, so in order to restrict this movement and to be certain that the housing does not move below a horizontal position, FIGS. 5 and 7, the projection 52 acts as a stop in engaging one of the legs 28. If the holders were mounted in an oarlock of a boat as shown in FIGS. 5 and 6 and the handle was actuated to move the horizontal part 74 out of one of the slots 50 the weight of the housing 30 and its offset mounting would result in a rotation of the housing about the pin 36 to a position wherein the housing would be pointed downwardly at such an angle that it would be impossible to insert the butt end of a fishing rod or pole into said housing. This excess movement of the housing is prevented by the projection 52 engage one of the legs 28.

The housing 30 has a segment removed from a sector thereof, FIG. 5 and 7, and replaced by a flexible or resilient like member 58. The member 58 has one end 82 affixed to a portion of the housing by welding or the like, FIG. 7, with the greater portion of said member being forced inwardly of the housing by camming surfaces 68 in the lever 64.

Although the foregoing description is necessarily of a detailed character in order that the invention may be completely set forth, it is to be understood that the specification terminology is not intended to be restrictive or confining, and that various rearrangements of parts and modifications of detail may be resorted to without departing from the scope or spirit of the present invention.

We claim:

1. A fishing rod holder comprising a tubular support and an elongated housing, said housing having radially extending disc like segments formed on a side thereof intermediate the center of and an end of said housing, said disc like segments being arranged to project outwardly from the side of said housing, said disc like segments arranged in face-to-face engagement with one another to form a unitary element which is pivotally connected to an end of said support, stop means on said disc like segments adapted to engage said tubular support to normally retain the longitudinal axis of said housing in a plane substantially perpendicular to the longitudinal axis of said support, said disc like segments having a plurality of spaced slots formed therein, a handle pivotally connected to said support subjacent the pivotal connection of said disc like segments to said support, said handle having a portion projecting outwardly from said pivotal connection and engaging one of the slots in said disc like segments for angularly positioning said housing with respect to the longitudinal axis of said support.

2. A fishing rod holder as defined in claim 1 wherein the surface of said housing opposite said radially projecting disc like segments is provided with a resilient member of a length approximating that of said housing and said housing has means thereon engagable with said member for moving said member inwardly of the housing to engage and insure the retention of a fishing rod in said housing.

3. A fishing rod holder as defined in claim 1 wherein said support has an annular flange affixed to its lower end portion for positioning said lower end portion in an oarlock receptacle of a boat, said lower end portion being internally threaded to receive an end of a locking bolt member that is formed with an annular collar that cooperates with said annular flange in locking said support in said oarlock receptacle, a lever pivotally connected to the other end of said locking bolt member for moving said locking bolt member into and out of said support.

4. A fishing rod holder as defined in claim 1 wherein said handle is formed as a unitary structure from a single piece of material and having a pair of horizontal portions arranged in spaced parallel relation to one another and joined together by an inclined segment, one of said horizontal portions being pivotally mounted in said vertical support and the other horizontal portion engaging said slots in said disc like segments.

5. A fishing rod holder as defined in claim 4 wherein a spring member is connected to said other horizontal portion and to the pivotal connection of said disc like segments to said vertical support.

6. A fishing rod holder as defined in claim 4 wherein said other horizontal portion terminates in an inclined section that projects in a direction opposite to said inclined segment and on the opposite side of said vertical support and which terminates in a member that extends in a plane parallel to the plane of the vertical support.

7. A fishing rod holder as defined in claim 1 wherein said handle includes a pair of contiguous parallel plate like members which are separated at one end and configured to form a rectangular box like shape which encircles and is pivotally connected to said support, said box like shape having one end of an arm affixed thereto with a protuberance formed on the other end of the arm for engaging said support to limit movement of the handle in a least one direction with respect to said support.

8. A fishing rod holder as defined in claim 1 wherein said housing is of a pentagonal configuration in cross section with a pair of spaced parallel slots extending from one end of the housing and terminating short of the opposite end to define a resilient member which is engaged by the camming surface of a lever pivotally mounted on the housing for moving said member to engage and retain a fishing rod in said housing.

* * * * *